United States Patent Office 3,378,709
Patented Apr. 16, 1968

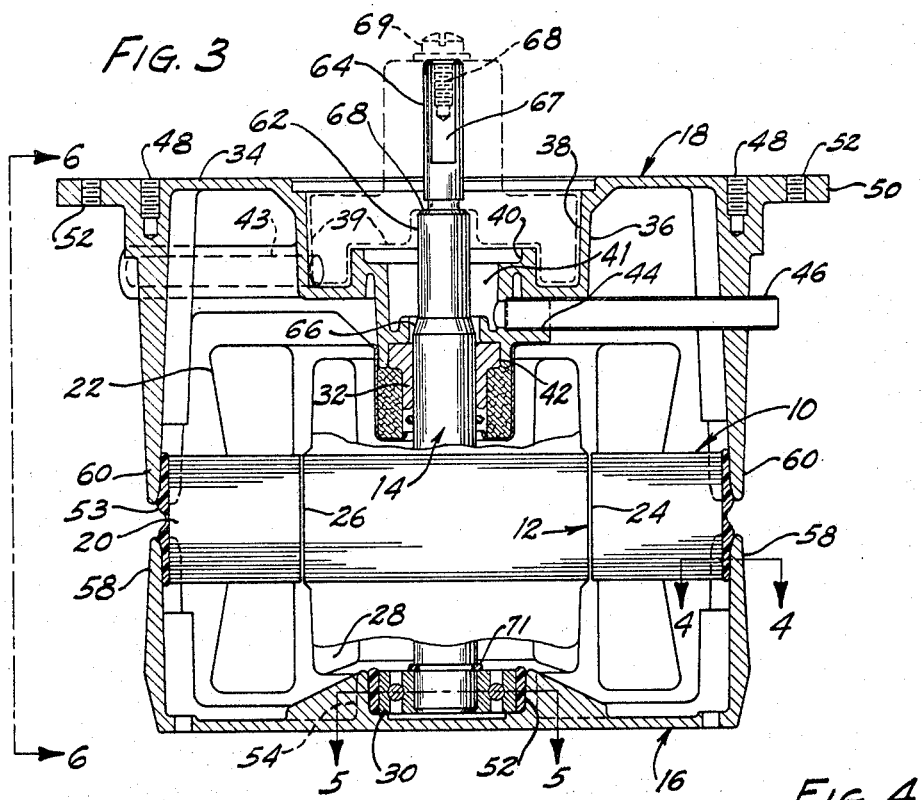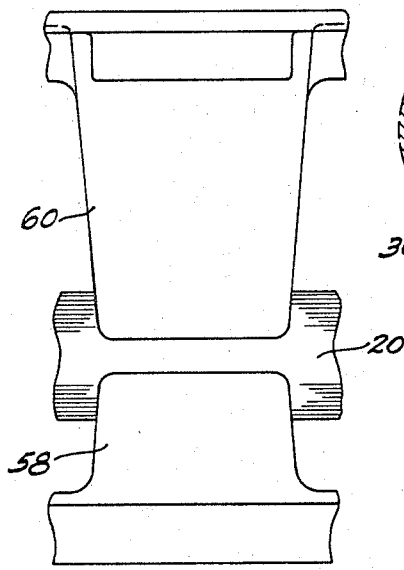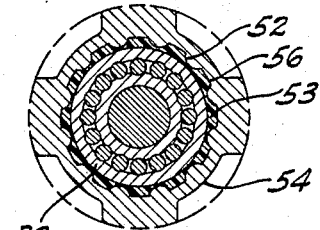

3,378,709
ELECTRIC MOTOR CONSTRUCTION
INCLUDING IMPELLER CAVITY
Neal B. Royer, Des Peres, Clinton H. Dederick, Brentwood, and John G. Lewis, Dellwood, Mo., assignors to Emerson Electric Co., St. Louis, Mo., a corporation of Missouri
Filed June 30, 1965, Ser. No. 468,439
6 Claims. (Cl. 310—90)

This invention relates to electric motor construction, adapted for use in dishwashers and the like, wherein the motor drives a pump.

Heretofore, manufacturers of dishwashers have usually purchased conventional electric motors to be mounted on the appliance with an extending motor drive shaft entering the appliance pump casing to be connected to the impeller therein. This practice required costly gauging and shimming operations upon assembly to insure the precise positioning of the drive shaft in the pump housing so that the impeller connected thereto was correctly positioned in the impeller cavity and the sealing means suitably fitted.

An object of the present invention is to provide a generally new and improved electric motor construction including a cavity formed in the motor frame adapted to receive a pump impeller and sealing means, whereby the motor drive shaft may be accurately positioned concentrically with respect to the impeller cavity and motor bearing and precise axial positioning of an impeller locating shoulder on the drive shaft with respect to the impeller cavity may be accomplished at relatively low cost upon assembly of the motor, thereby reducing the assembly of the motor to the appliance to a very simple and inexpensive operation.

A further object is to provide an electric motor having a stator including a core and a rotor including a drive shaft in which a pair of rigid end shields each support a bearing journalling the drive shaft and one of which has formed therein a pump impeller cavity, and in which circularly arranged, axially extending portions of each end shield overlie the sides of the stator core in slightly spaced relationship therewith and are cemented thereto to form a rigid motor frame.

Other objects and advantages will appear from the following description when read in connection with the accompanying drawings:

In the drawings;

FIG. 3 is a cross-sectional view taken on line 3—3 of FIG. 1;

FIG. 4 is a fragmentary sectional view taken on line 4—4 of FIG. 3;

FIG. 5 is a sectional view taken on line 5—5 of FIG. 3 showing the lower ball bearing; and FIG. 6 is a fragmentary elevational view showing the attaching leg portions of the end shields.

Figure 1:
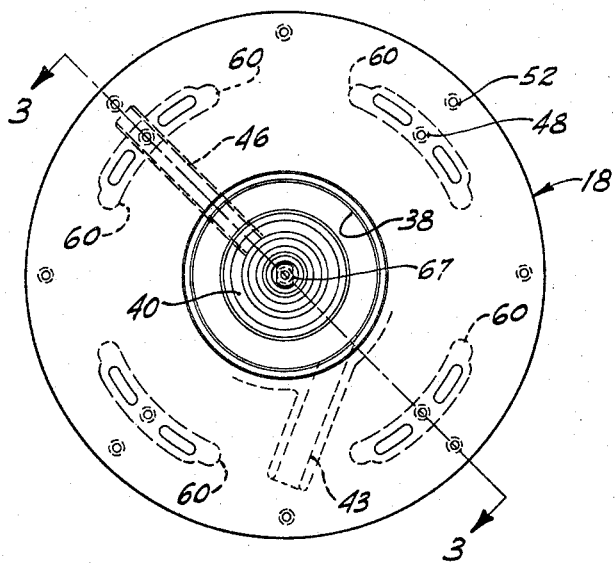
FIG. 1 is a top plan view of an electric motor constructed in accordance with the present invention.

Referring to the drawings in more detail, the motor is shown disposed in a vertical position in FIG. 3 and comprises a stator generally indicated at 10, a rotor generally indicated at 12 including a drive shaft generally indicated at 14, a lower end shield generally indicated at 16, and an upper end shield generally indicated at 18. For the purpose of illustration, an A.C. motor is shown; however, the motor may be of the D.C. type.

The stator 10 comprises a laminated iron core 20 of generally square shape with rounded corners and is slotted to receive field windings 22. The stator core is also provided with a central bore 24. The rotor comprises a cylindrical laminated core 26 slotted to receive rotor windings 28. The rotor core is fixed on drive shaft 14 and positioned to rotate within stator bore 24. The drive shaft 14 is journalled in a lower ball bearing 30 fixed in lower end shield 16 and in an upper sleeve bearing 32 fixed in upper end shield 18.

The end shields 16 and 18 are preferably formed as castings. Upper end shield 18, being of generally flat, circular shape, has an upper flat surface 34 and a depending, hollow, central portion 36 wherein is formed a circular pump impeller cavity 38 and a concentric circular, shallow recess 40. The impeller cavity 38 is adapted to receive an impeller 39, indicated in dotted line at 39, and the shallow recess 40 is adapted to receive a sealing means (not shown) upon assembly of the motor to an appliance. The upper sleeve bearing 32 is press-fitted into a circular recess 42 formed in the bottom of the central depending portion 36 of upper end shield 18 concentrically with the impeller cavity 38, and seal recess 40. Precise concentricity of the impeller cavity 38, the seal recess 40, and upper drive shaft bearing 32 are achieved by machining these cavities in line, and the axial dimension from the bottom of the impeller cavity 38 to the bottom of the seal recess 40 is precisely maintained by machining with a single stepped tool.

The upper end shield 18 further includes a tangental outlet passage 43 formed in an integral boss and leading from the lower part of impeller cavity 38 to the periphery of the end shield and a radial drain passageway 44 leading from a lower chamber 41 and including an extension tube 46. A circularly arranged series of blind-tapped holes 48 is provided in the upper flat surface of end shield 18 to receive attaching screws for attachment to a cover member (not shown) upon assembly of the motor to the appliance. It is to be understood that such cover member to be attached upon assembly of the motor to the appliance forms with the impeller cavity 38 a pump housing and includes the fluid inlet opening to the impeller cavity 38. The upper end shield 18 is further provided with a peripheral flange 50 having a circularly arranged series of through-tapped holes 52 adapted to receive attaching screws for connecting the motor to the appliance.

The lower end shield 16, in plan view, conforms generally to the shape of the stator core 20, that is; generally square with rounded corners, and has a generally circular recess 52 formed in a central upstanding boss 54 adapted to receive the ball bearing 30. The recess 52 is made slightly larger in diameter than the ball bearing 30 to permit alignment of the bearing upon assembly and to provide space for cementing material 53 which fixes the bearing in position in the recess upon assembly of the end shields to the stator core. The recess 52 is further provided with radial relief recesses 56 which provide space for excess cementing material, see FIG. 5. The ball bearing 30 is of the type which will satisfactorily carry axial as well as radial loads occurring in its instant use. By making the recess larger in diameter than the ball bearing 30, it may be formed when casting end shield 16, thereby eliminating the necessity of machining the casting.

Both end shields 16 and 18 are provided wtih four integrally formed, circularly arranged legs, indicated at 58 and 60, respectively, which axially overlie the sides of the stator core 20. The legs 58 and 60 are arcuate in cross-section, as shown in FIG. 4, and overlie portions of the sides of the stator core at its rounded corners and are cemented thereto by a cementing material 53. The dimension between the diametrically opposed legs is somewhat greater than the dimension across the rounded corners of the stator core, thereby to provide ample space for transverse alignment of the end shields upon assembly of the motor.

The drive shaft 14 has first and second reduced diameter portions 62 and 64 in the portion thereof extending upwardly beyond sleeve bearing 32 and above the upper surface of end shield 18. A tapered shoulder 66 is formed at the point of first reduction and a square shoulder 68 is formed at the point of second reduction. The reduced portion 64 of the shaft has a pair of opposed, longitudinally extending, flat surfaces 67 forming a non-circular end portion of the shaft adapted to be received in a complementary non-circular bore in the hub portion of the impeller 39. An axial tapped hole 68 in the upper end of shaft 14 is adapted to receive a hold-down screw 69 which holds the impeller 39 against the square shoulder 68.

It will be seen from the foregoing that the axial position of square shoulder 68 on shaft 14 relative to the impeller cavity 38 and seal recess 40 determines the axial position of the impeller in the cavity and therefore the axial space between the impeller and a seal seated in recess 40. The axial location of shaft shoulder 68 is therefore critical.

Figure 2:
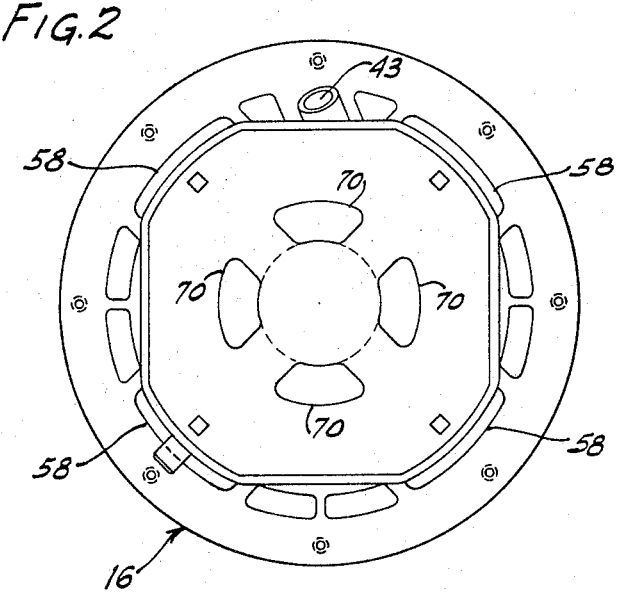
FIG. 2 is a bottom plan view.

In assembling an electric motor constructed in accordance with this invention, the rotor is positioned in the stator and four removable shims of equal thickness are inserted in circularly spaced arrangement between the rotor 26 and the wall of stator bore 24, thereby to establish a uniform air gap between the rotor and stator. The shims are of sufficient length and are positioned so they will extend through four perforations 70 in the bottom of the lower end shield 16, see FIG. 2, to facilitate removal. The fit of the shims is sufficiently tight to maintain the axial as well as the concentric position of the rotor in the stator during further assembly operations, but may be readily pulled out after assembly.

The upper end shield 18 is placed in an inverted position (from that shown in FIG. 3 of the drawing) on a fixture having an upstanding cylindrical bushing which enters and nicely fits the circular seal recess 40. The end shield 18 is supported in this position with the flat bottom of seal cavity 40 resting on the upper end of the fixture bushing. The fixture bushing is provided with a concentric, axial bore extending therethrough which receives the upper reduced portion 64 of the motor drive shaft in close fit relationship and is further provided with a counterbore extending inwardly from its upper end and terminating in a square shoulder, the counterbore being of such diameter as to receive the reduced portion 62 of the drive shaft in close fit relationship. The depth of the counterbore in the fixture bushing is made precisely equal to that of the required axial dimension from the bottom of seal recess 40 to the square shoulder 68 on drive shaft 14 to insure proper positioning of the impeller in cavity 38 and the required space for the seal.

With the upper end shield 18 thus placed in an inverted position on the fixture bushing, cementing material 53 in a thick pasty form is applied to the inner surfaces of its legs 60 at their end portions, and the stator and rotor are then assembled on the end shield 18, also in an inverted position (from that shown in FIG. 3 of the drawing), with the drive shaft passing through sleeve bearing 32 and entering the bore and counterbore in the fixture bushing. Cementing material 53 is placed on the side walls of bearing cavity 52 in lower end shield 16 and ball bearing 30 is placed therein. Cementing material is also placed on the inner surfaces of legs 58 of the lower end shield 16 and the lower end shield is then assembled, also in inverted position, with the end of the drive shaft entering the ball bearing 30 and the ends of legs 58 overlying the sides of the stator. A snap ring 71 limits the entry of the shaft 14 into the bearing 30. The free fit of the bearing 30 in cavity 52 and the clearance between the legs 58 of the lower end shield and the stator permit the bearing 30 to align itself with the shaft 14 which enters it.

The cementing material 53 is preferably an adhesive epoxy resin in thick pasty form, which is convenient to apply, does not flow appreciably, and sets up with negligible shrinkage in a relatively short time with the application of modern heat. After the motor is assembled on the fixture as described, the motor on the fixture is placed in an oven and baked at a moderate temperature to accelerate the setting of the epoxy cementing material 53. When the cementing material is sufficiently hardened, the motor is removed and the projecting shims are pulled out through the four openings 70 in the end shield 16.

It will be seen from the foregoing that we have provided a simple and economical motor construction incorporating an impeller cavity and seal recess formed in the motor frame concentric with the drive shaft and have further provided a reference or locating shoulder on the motor drive shaft in precise axial relationship with the impeller cavity and seal recess, thereby to facilitate simple assembly of an impeller and seal with assurance of proper fit of these elements when the motor is assembled on an appliance. It will be further seen that the method of assembling the motor assures a uniform circumferential air gap between the rotor and stator and alignment of the motor drive shaft and its bearings.

We claim:

1. In an electric motor having a stator and a rotor including a drive shaft rotatably mounted in said stator, an end shield at each end of said stator, each having a plurality of axially extending legs the end portions of which overlie the periphery of said stator, each of said end shields further including a bearing mounted therein journalling an end portion of said shaft, one of said end shields having an impeller cavity formed therein surrounding one end portion of said drive shaft, said one end portion of said drive shaft having a shoulder formed thereon adapted to axially position an impeller to be mounted on said shaft for rotation in said impeller cavity, abutment means on said shaft limiting axial movement thereof with respect to the other of said end shields, and said end shield legs being cemented to peripheral portions of said stator with a cementing material which initially has a soft form and hardens to provide the rigid connection of said end shields to said stator, whereby said one end shield may be positioned to attain a predetermined axial relationship of said impeller cavity and said shoulder on said drive shaft while said cementing material is in a soft form.

2. In an electric motor having a stator and a rotor including a drive shaft rotatably mounted in said stator, a motor frame comprising an end shield at each end of said stator, each including a plurality of circularly arranged, axially extending legs, the end portions of which overlie the sides of said stator in slightly spaced relationship thereto thereby to permit slight lateral movement of said end shields with respect to said stator, each of said end shields including a bearing journalling an end portion of said shaft, one of said end shields having an impeller cavity formed therein concentric with said shaft and coextending with one end portion thereof, said one end portion of said shaft having a shoulder formed thereon adapted to axially position an impeller to be mounted on said shaft for rotation in said cavity, abutment means on said shaft limiting axial movement thereof with respect to the other of said end shields, said other of said end shields including a plurality of circularly arranged access perforations therein, and said end shield legs being cemented to said stator with a cementing material which has a soft pliable form initially and hardens to provide the rigid connection of said legs to said stator, whereby upon assembly of the motor said rotor may first be positioned concentrically and axially in said stator by circularly arranged shims and thereafter said end shield having cementing material in a soft state applied to the inner surfaces of its leg portions may be assembled and the bearings therein aligned by entering the end portions of said shaft in said bearings, and said one end shield may be positioned axially to attain a precise predetermined axial relationship of said shaft shoulder and said impeller cavity and whereby the shims positioning said rotor in said stator may be removed axially through said access holes in said other end shield when said cementing material has hardened.

3. In an electric motor, a stator, and a rotor including a drive shaft rotatably mounted in said stator, support means at one end of said stator rigidly connected thereto and having a bearing mounted therein journalling one end portion of said shaft, stop means on said shaft limiting axial movement thereof with respect to said support means, an end shield at the other end of said stator having a bearing mounted therein journalling an opposite end portion of said shaft, said end shield including a plurality of circularly arranged and axially extending leg portions overlying the sides of said stator and being slightly spaced therefrom thereby to permit slight lateral movement of said end shield on said stator, said end shield having formed therein an impeller cavity surrounding and coextending with said opposite end portion of said shaft and being adapted to receive an impeller to be drivingly mounted on said opposite end portion of said shaft, said opposite end portion of said shaft having a shoulder formed thereon adapted to axially position an impeller to be mounted thereon, and said leg portions of said end shield being cemented to the sides of said stator by a cementing material having a pliable form when applied and hardening to provide the rigid connection of said end shield to said stator, whereby said end shield having cementing material in a pliable state applied to the inner surfaces of its leg portions may be freely assembled on said stator by entering said opposite end portion of said shaft into the bearing therein and may be moved axially with respect to said stator to permit precise axial positioning of said impeller cavity formed therein with respect to said shoulder on said shaft.

4. In an electric motor adapted to vertical shaft operation, a stator and a rotor including a drive shaft mounted for rotation in said stator about a vertical axis, a support member at the lower end of said stator rigidly connected thereto and including a ball bearing entered into an annular recess in said support member and journalling the lower end portion of said shaft, said ball bearing being capable of supporting the downward thrust of said shaft and said shaft being provided with an abutment surface operative to limit the downward movement thereof with respect to said ball bearing, an end shield at the upper end of said stator including a plurality of downwardly extending circularly arranged leg portions overlying the sides of said stator in slight spaced relationship therewith thereby to permit a slight lateral movement of the end shield with respect to the stator, a sleeve bearing press fitted in a bore in said end shield journalling the upper end portion of said shaft, said annular recess in said support member being of larger diameter than said ball bearing thereby to permit slight lateral movement of said ball bearing therein, and said ball bearing being cemented in said recess and said leg portions of said end shield being cemented to the sides of said stator by cementing material having a pliable form when applied and subsequently hardening to provide the rigid connection of said ball bearing in said support member and said leg portions of said end shield to said stator, whereby upon assembly said ball bearing and said sleeve bearing with said end shield may be shifted laterally while said cement is in a pliable state to accommodate some preset axial alignment of said rotor and shaft in said stator.

5. An end shield for an electric motor comprising an end wall having a flat mounting surface on one side thereof, a plurality of circularly arranged integral leg portions projecting from the other side thereof for attachment to a motor stator, a central integral boss projecting from said other side of said end wall to a lesser extent than said leg portions, a longitudinal bore through said boss and a motor shaft bearing fitted in said bore near the projecting end of said boss, and an impeller cavity formed in said boss concentric with said bearing and entering from said one side of said end wall.

6. In a dishwasher motor adapted to vertical shaft operation, a stator and a rotor including a drive shaft mounted for rotation in said stator about a vertical axis, upper and lower end shields each including an end wall and a plurality of integrally formed and axially extending legs which overlie the sides of said stator about its periphery in slightly spaced relationship therewith thereby to permit a slight lateral movement of said end shields with respect to said stator, a central annular recess in the end wall of said lower end shield entering from its inner surface, a ball bearing loosely fitted in said recess and journalling the lower end of said shaft, stop means on said shaft limiting its downward movement in said ball bearing, a central integral boss depending from the end wall of said upper end shield, an axial bore in the lower end of said boss, a sleeve bearing press fitted in said bore journalling an upper end portion of said shaft, said shaft having an upper end portion extending upwardly beyond said sleeve bearing, an annular impeller cavity formed in the end wall of said upper end shield entering from its upper surface and concentric with and coextending with said upper end portion of said shaft, a shoulder formed on said upper end portiton of said shaft adapted to axially position an impeller to be drivingly mounted thereon, and said leg portions of said end shields being cemented to the sides of said stator, and said ball bearing being cemented in said recess in said lower end shield by a cementing material which is applied in pliable form upon assembly and subsequently hardens to rigidly connect these members.

References Cited
UNITED STATES PATENTS 2,381,834    7/1945    Meredew et al.   ------- 310—91
2,822,485    2/1958    Braun et al.   -------- 310—157
3,195,466    7/1965    Young   ------------- 310—90

MILTON O. HIRSHFIELD, *Primary Examiner.*

L. L. SMITH, *Assistant Examiner.*